(12) United States Patent
Drouillard et al.

(10) Patent No.: US 7,762,212 B2
(45) Date of Patent: Jul. 27, 2010

(54) SELF-CLEANING ANIMAL WATERING DEVICE

(75) Inventors: James S Drouillard, Olsburg, KS (US); Jared Henry, Manhattan, KS (US); David M Sattler, Herndon, KS (US)

(73) Assignee: Kansas State University Research Foundation, Manhattan, KS (US)

( * ) Notice: Subject to any disclaimer, the term of this patent is extended or adjusted under 35 U.S.C. 154(b) by 194 days.

(21) Appl. No.: 12/105,123

(22) Filed: Apr. 17, 2008

(65) Prior Publication Data

US 2008/0257274 A1  Oct. 23, 2008

Related U.S. Application Data

(60) Provisional application No. 60/912,464, filed on Apr. 18, 2007.

(51) Int. Cl.
*A01K 7/02* (2006.01)

(52) U.S. Cl. .......................................... 119/72; 119/81

(58) Field of Classification Search ............... 119/72, 119/74, 78–81, 51.5; *A01K 7/02, 7/04, 7/00*
See application file for complete search history.

(56) References Cited

U.S. PATENT DOCUMENTS

| | | | |
|---|---|---|---|
| 3,371,652 A | 3/1968 | Louks et al. | |
| 4,309,962 A | 1/1982 | Boozer | |
| 4,347,809 A * | 9/1982 | Gloggler | 119/81 |
| 5,566,639 A * | 10/1996 | McKinstry et al. | 119/78 |
| 6,619,232 B2 | 9/2003 | Johnston et al. | |
| 2003/0213437 A1* | 11/2003 | Norris | 119/74 |
| 2008/0173246 A1* | 7/2008 | Barkdoll | 119/74 |
| 2009/0241848 A1* | 10/2009 | Bryant | 119/73 |

\* cited by examiner

*Primary Examiner*—Son T Nguyen
*Assistant Examiner*—Shadi Baniani
(74) *Attorney, Agent, or Firm*—Hovey Williams LLP

(57) ABSTRACT

A self-cleaning, low-maintenance, water-saving automated animal watering device (10) is provided which includes a watering tank (12) moveable between a lower, water-full condition and an upper, water-low condition. Preferably, one end of the tank (12) is pivotally supported by a pivot shaft (64), while the other end of the tank is biased upwardly via a lower lift spring (72). The device (10) also has a water fill assembly (16) operably coupled with tank (12) to selectively fill the tank (12) when needed, and a drain valve assembly (18) also coupled with tank (12) in order to completely drain the tank (12) on a periodic basis. A control assembly (20) is coupled with at least the tank (12) and drain valve assembly (18), and is operable to actuate the drain valve assembly (18) after a predetermined number of movements of the tank (12) between the elevated and lowered positions thereof.

13 Claims, 6 Drawing Sheets

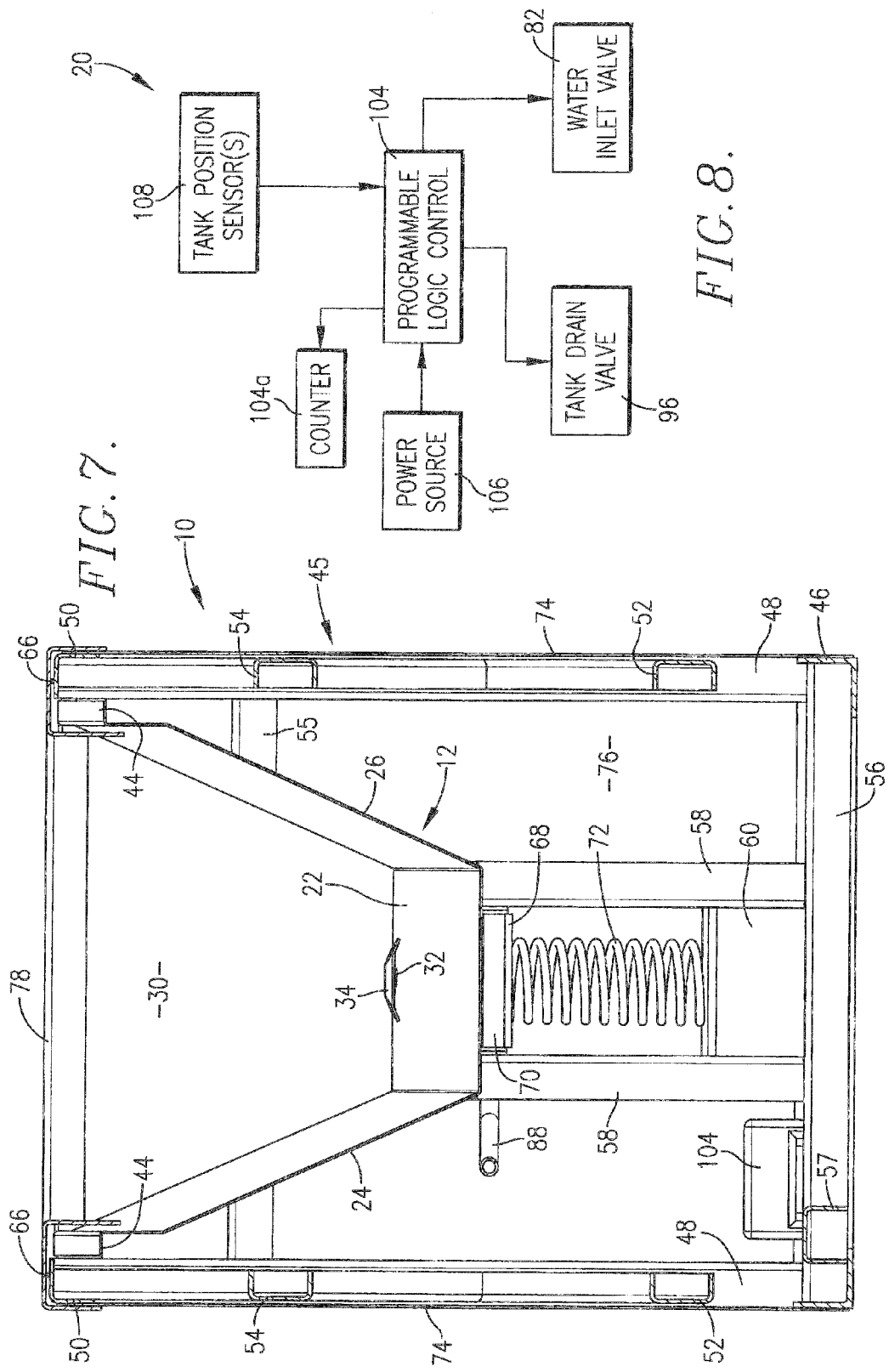

SELF-CLEANING ANIMAL WATERING DEVICE

CROSS-REFERENCE TO RELATED APPLICATION

This Application claims the benefit of Provisional Application Ser. No. 60/912,464, filed Apr. 18, 2007. This Provisional Application is incorporated by reference herein in its entirety.

BACKGROUND OF THE INVENTION

1. Field of the Invention

The present invention is broadly concerned with automated, self-cleaning, low-maintenance and low-labor animal watering devices. More particularly, the invention is concerned with such watering devices and methods which provide automatic water filling of a livestock watering tank as water is consumed, as well as predictable, complete water drainage as necessary to reduce bacteria and algae buildup in the water, with only a minimum of fresh water usage for tank cleaning purposes.

2. Description of the Prior Art

Providing adequate supplies of fresh water to farm animals, particularly cattle, is a prime prerequisite for maintaining animal health, well being, and growth. This is particularly the case in confined animal feeding operations (CAFOs) where heavy water consumption by many animals tends to create poor water quality conditions. That is, animal feed particles and other debris collects in watering tanks raising the bacterial count therein to unacceptable levels and promoting undesirable algae growth.

It is also important that maintenance of animal watering tanks be as automated as possible CAFOs, needing only a minimum of operator intervention. In cattle feedlots, the daily labor required for continually filling, draining, and cleaning of standard, static water tanks can be excessive.

Another CAFO animal watering problem is excessive use of water. In many locales, water constraints are imposed upon CAFOs, and thus is its important that only a minimum amount of water be wasted. Hence, the simple expedient of daily draining of water tanks, while potentially ameliorating the bacterial count and algae growth problems, uses undue amounts of fresh water.

In response to these problems, it has been known to provide watering tanks equipped with a float mechanism and an associated water fill valve to control the water level in the tank. As the tank water level decreases owing to animal water consumption, the float mechanism operates to open the fill valve. Inasmuch as the tank is continuously refilled to the same level, there is a tendency for a contaminant or scum line to form, which requires significant and frequent cleaning of the tank.

In other designs, an upper end of a watering tank is hingedly supported with a lift spring beneath the tank at the opposite end thereof. A water inlet valve is coupled to a source of water and the tank, and linkage between the tank and inlet valve is provided. As water is consumed from the tank, the spring biases the tank upwardly until a limit is reached. At this point the valve linkage serves to open the valve to refill the tank. Such a watering device is illustrated in U.S. Pat. No. 4,347,809. However, the '809 patent device does not provide for automated tank drainage, but instead requires an operator to manually open a drain.

U.S. Pat. No. 3,371,652 describes an automatic livestock watering device of the float control variety. This design is also equipped with an automatic drain assembly including an impeller located within the water inlet line and rotatable in response to inlet water flow. The impeller is operably coupled with a gear train carrying a lug. As the gear train rotates in response to water flow, the lug eventually contacts a toggle rod, which serves to open the drain assembly. Such a purely mechanical system is deficient because it fails to achieve predictable water drainage. Specifically, many CAFO watering sites are connected to well pumps of greatly differing water pressures, such that actuation of the impeller-operated drain assembly varies over a wide range. Furthermore, such well water is often contaminated with dirt or other debris, which can clog the impeller mechanism and prevent proper operation thereof.

Other prior art animal watering devices are described in U.S. Pat. Nos. 4,309,962 and 6,619,232. The systems disclosed in these patents do not provide a periodic automated drain function, and are thus deficient.

There is accordingly a need in the art for improved animal watering devices especially useful in CAFO contexts, and which provides automated water fill and predictable drainage with only a minimal amount of fresh water wastage.

SUMMARY OF THE INVENTION

The present invention overcomes the problems outlined above and provides improved, self-cleaning, low-maintenance, low cleaning water usage animal watering devices. Generally speaking, watering devices in accordance with the invention comprise a watering tank, and a support assembly operable to support the tank and to cause movement thereof between an elevated position corresponding to a lower water level in the tank, and a lowered position corresponding to a higher water level in the tank. Preferably, the tank is pivotally supported at one end thereof, and a lower lift spring adjacent the opposite end of the tank is positioned to bias the tank upwardly against the weight of water therein. The overall watering device further includes a selectively actuatable water fill assembly operably coupled with the tank in order to add water to the tank as necessary; the water fill assembly normally includes an electrically or mechanically operated fill valve coupled to a source of pressurized water, with a water line from the valve to the tank. Additionally, the watering device has a selectively actuatable drain valve assembly operably coupled with the tank in order to drain the tank, normally in the form of a motor or solenoid-operated gate, butterfly, or ball valve. A control assembly is operably coupled with the tank and the drain valve assembly, with the control assembly operable to actuate the drain valve assembly after a predetermined number of movements of the tank between the elevated and lowered positions thereof.

The invention also provides a method of maintaining an animal watering device having a water tank moveable between an elevated position corresponding to a lower water level in the tank, and a lowered position corresponding to a higher water level in the tank, and to periodically drain the watering tank. This method comprising the steps of monitoring the position of the tank and successively adding water to the tank when the tank reaches the elevated position thereof corresponding to the lower water level, and in response thereto causing the tank to move to the lowered position corresponding to the higher water level therein. The method also involves draining water from the tank after a predetermined number of the movements of the tank between the elevated and lowered positions thereof. Such tank monitoring is preferably carried out using one or more tank position sensors coupled with a control device (which may be digital or analog), and is preferably a programmable logic controller, with the control device also operably coupled with a water inlet valve and drain valve.

BRIEF DESCRIPTION OF THE DRAWINGS

FIG. 7 is a vertical sectional view taken along line 7-7 of FIG. 5; and

FIG. 8 is a schematic illustration of the preferred control assembly for the watering device.

DETAILED DESCRIPTION OF THE PREFERRED EMBODIMENT

Figures 1, 2:
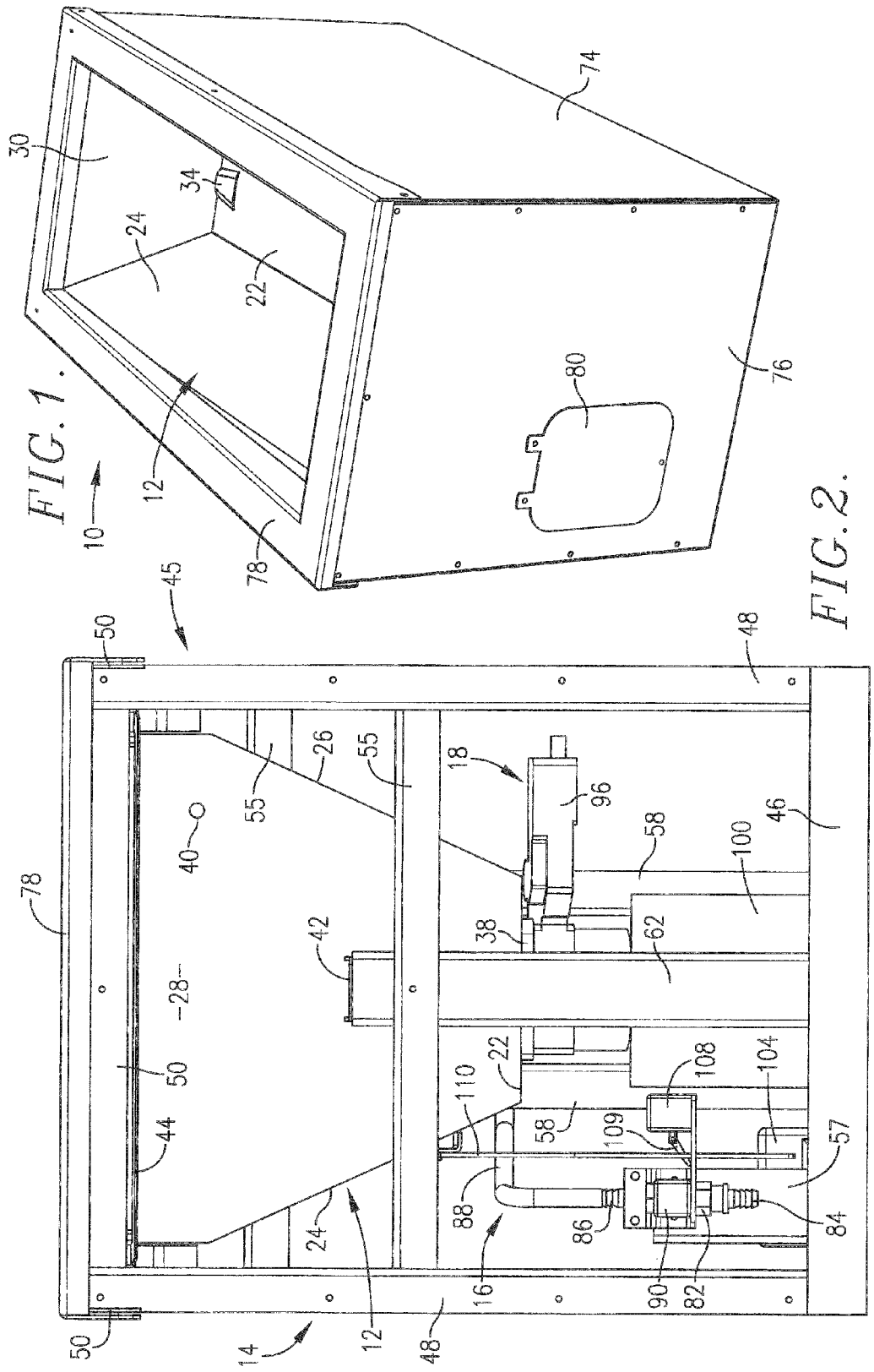
FIG. 1 is a perspective view of a preferred animal watering device in accordance with the invention.
FIG. 2 is an end elevation of the watering device, with side and end panels removed.

Turning now to the drawings, an animal watering device 10 is illustrated. The device 10 broadly includes a water tank 12, a tank support assembly 14, a water fill assembly 16, a drain valve assembly 18, and a control assembly 20. The tank 10 is designed to provide low-maintenance watering of farm animals, especially cattle, and particularly in the CAFO context. To this end, the device 10 provides automatic water filling as animals consume water from the tank 12, as well as periodic, complete water drainage so as to minimize contaminant buildup.

Figure 5:
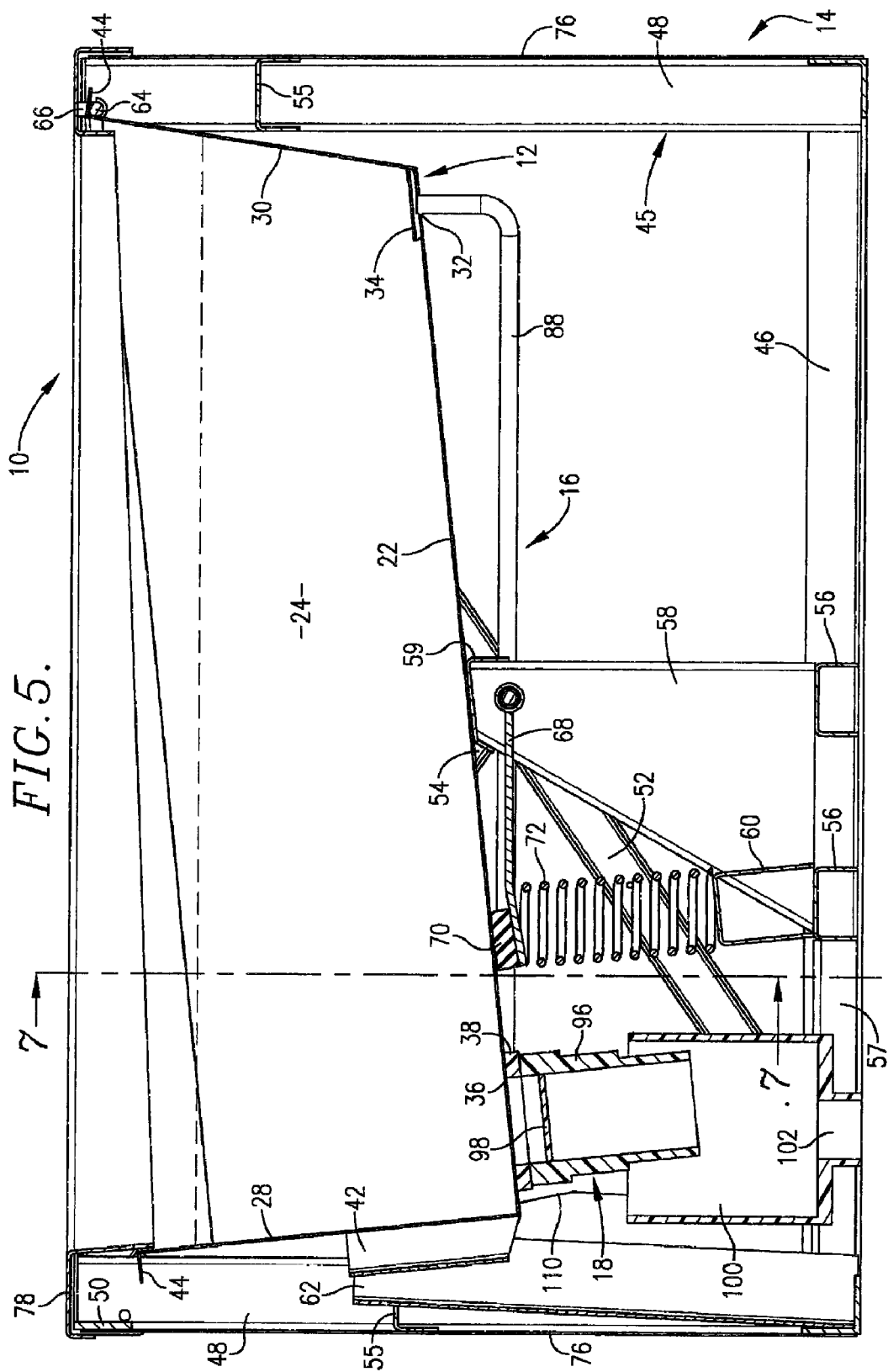
FIG. 5 is a longitudinal central vertical section of the device, illustrating the watering tank in its full or down position.
Figure 6:
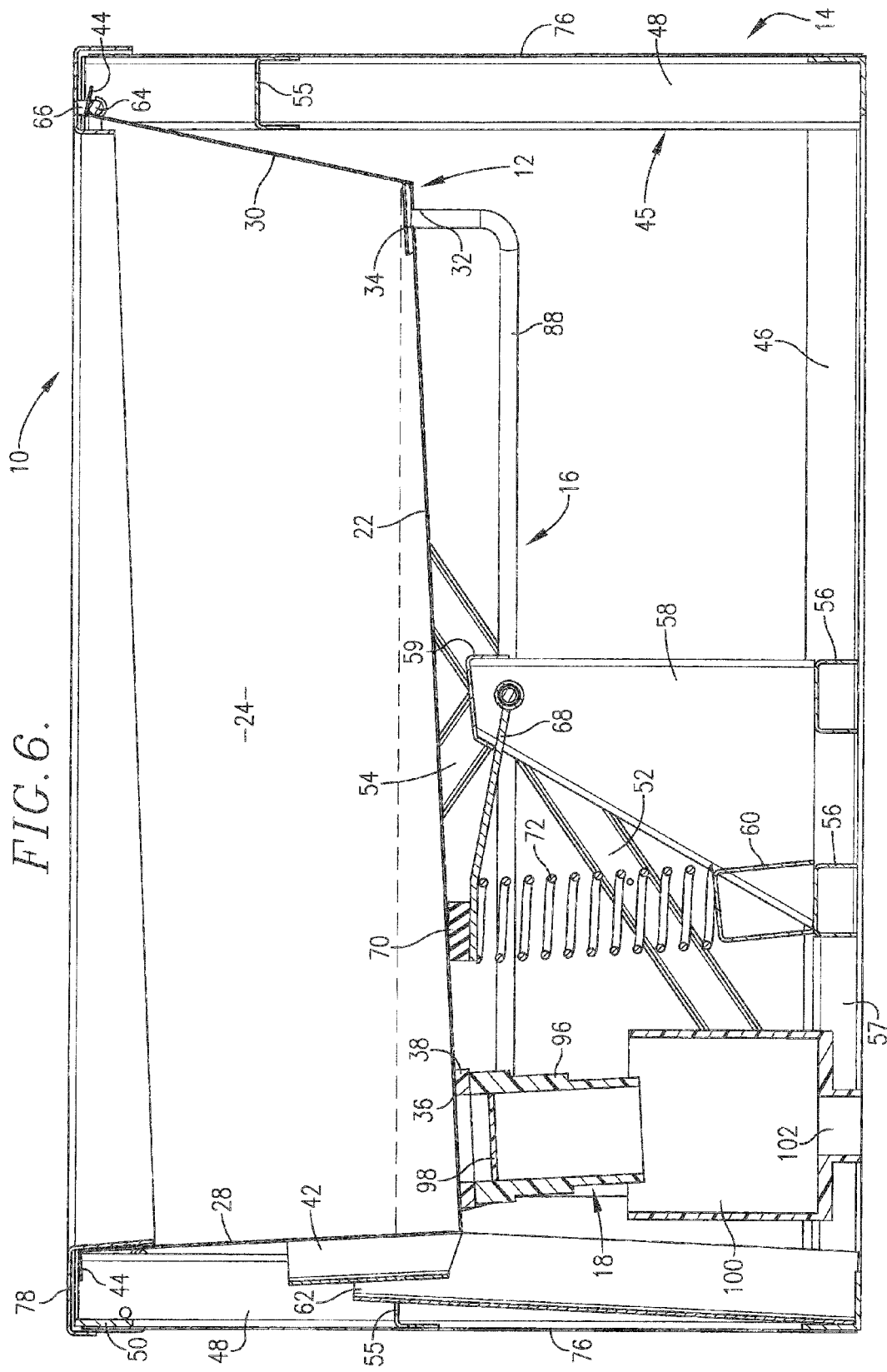
FIG. 6 is a view similar to that of FIG. 5, but with the tank in its up position ready to be refilled with water.

In more detail, the tank 12 is in the form of an elongated, open-top vessel having a bottom wall 22, a pair of upstanding, oblique sidewalls 24 and 26, and end walls 28 and 30. The bottom wall 22 is equipped with a water inlet fill opening 32 covered by a deflector 34. Additionally, the bottom wall 22 has a drain opening 36 with a spacer 38 affixed to the underside of the bottom wall in registry with opening 36. The end wall 28 has an upper overflow opening 40, and an elongated, centrally located, exterior tank guide rail 42. As best seen in FIGS. 5-7, the tank walls 24-30 cooperatively present an outwardly extending, continuous lateral lip 44.

Figure 4:
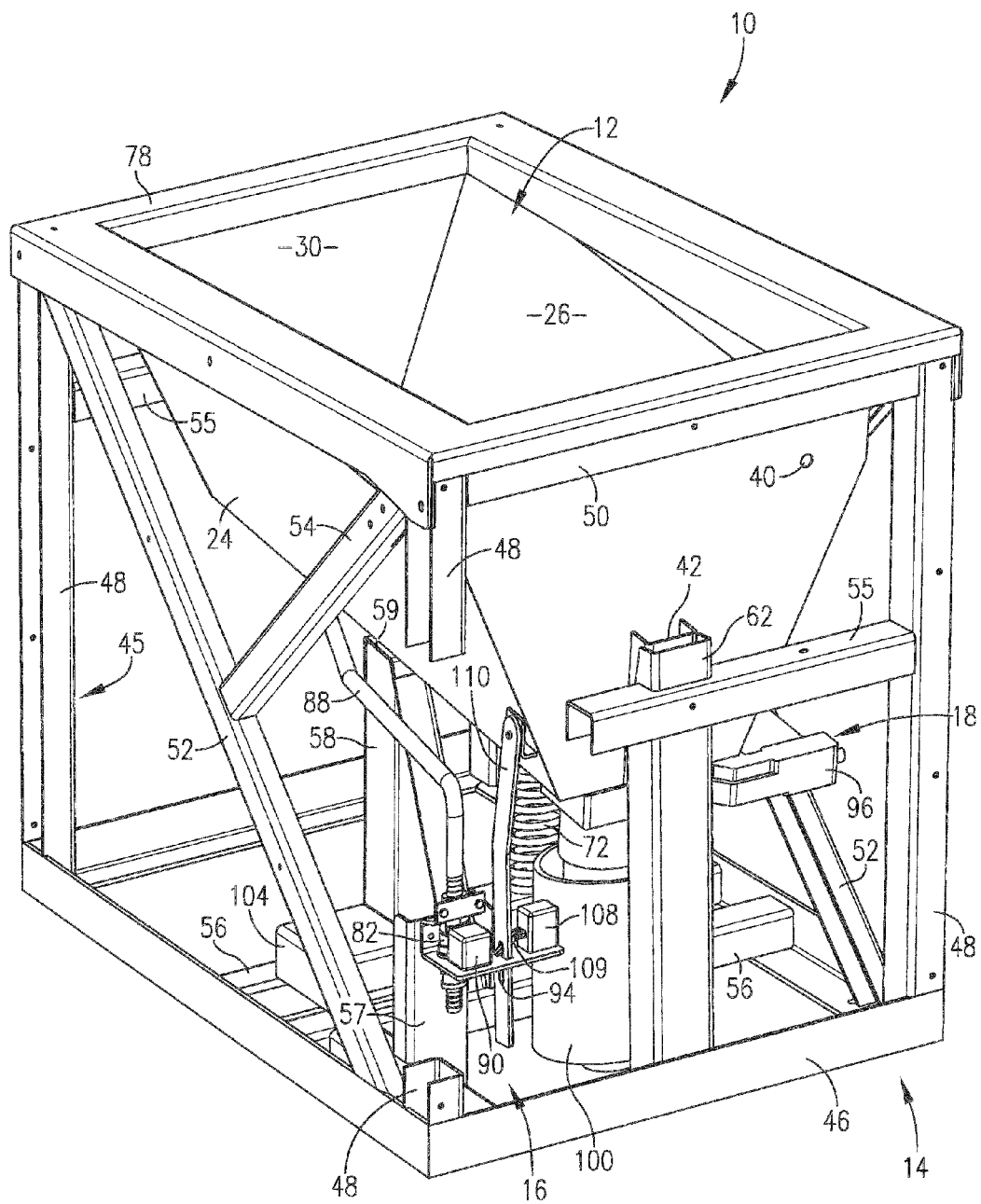
FIG. 4 is a perspective view of the watering device with certain frame components cut away for clarity.

The tank support assembly 14 includes a box-like frame assembly 45 including a lower, rectangular, ground-engaging frame 46, upstanding corner posts 48, and three top stringers 50 of inverted L-shaped configuration supported by the posts 48 and extending around the periphery of the frame assembly 45 except for the end section adjacent end wall 30. Oblique cross braces 52 and 54 extend between the superposed side rails of the ground frame 46 and side stringers 50 as shown. The like manner, cross braces 55 extend between the end posts 48. The ground frame 46 also has a pair of medial, spaced apart crosspieces 56 which support a pair of central, upright, tank stops 58 surmounted by a top rail 59, and a lift spring mount 60. An upright valve support post 57 of inverted T-shape is attached between a cross piece 56 and the adjacent cross rail of ground frame 46 (FIG. 4). As best seen in FIGS. 2 and 46, the ground frame 46 further supports an upstanding, obliquely oriented, generally U-shaped guide channel 62 which receives tank guide rail 42.

A tank pivot shaft 64 extends between the posts 48 opposite channel 62. The shaft 64 engages the underside of lip 44 across tank end wall 30, and a transverse shaft hold-down lug 66 serves to secure the shaft 64 in position. Accordingly, the tank 12 is pivotal about the longitudinal axis of shaft 64.

The opposite end of tank 12 is supported by means of an elongated lift arm 68 pivotally supported and extending between the tank stops 58. The outboard end of lift arm 68 is equipped with a tank-engaging pad 70. A coil lift spring 72 extends between spring mount 60 and the underside of lift arm 68, and serves to bias tank 12 upwardly.

Figure 3:
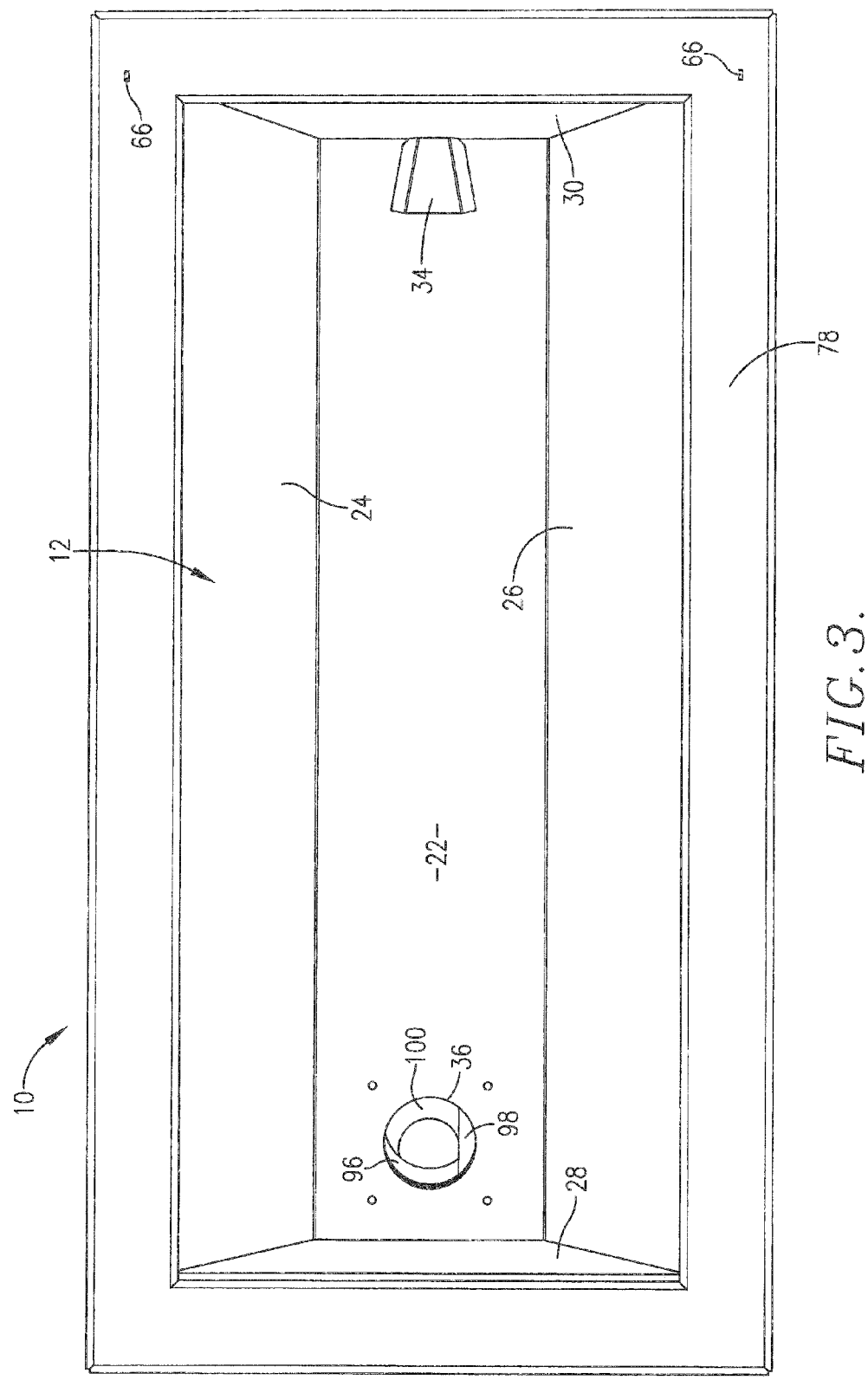
FIG. 3 is a plan view of the watering device.

In normal practice, the frame assembly 45 is covered by side and end panel walls 74 and 76, and the upper periphery of the frame 45 is likewise covered by a rectangular, U-shaped in cross section top cover 78 (see FIGS. 1 and 3). An access hatch 80 is affixed to end wall 76 adjacent channel 62, in order to allow access to the working components within the frame assembly.

The water fill assembly 16 includes a solenoid-operated water inlet valve 82 mounted on valve support post 57. The valve 82 has an inlet nipple 84 adapted for coupling to a source of pressurized water (not shown), as well as an outlet nipple 86. An elongated water inlet pipe 88 extends between nipple 86 and tank inlet opening 32 for delivery of water to tank 12. The valve 82 has an electrically actuated on-off solenoid operator 90 controlled by assembly 20 as will be described. In other forms, use can be made of other known inlet valves such as mechanical valves, instead of solenoid valves.

The drain valve assembly 16 includes a motor-operated gate valve 96 which is secured to the underside of spacer 38. The valve 96 is itself conventional, and has a reciprocal gate 98 moveable via a gear drive (not shown) between a closed position preventing the flow of water through drain opening 36, and an open position permitting such drain flow. A suitable commercially available drain valve is commercialized by PhaseFour Industries under the designation DM20-RP Drain Master Valve. A cylindrical, upstanding tubular drain collector 100 is mounted beneath the outlet of valve 96 and presents a lowermost drain opening 102. The valve 96 is selectively actuatable under the control of assembly 20 as will be described.

The control assembly 20 is schematically illustrated in FIG. 8 and includes a digital controller in the form of a programmable logic control (PLC) 104 powered by source 106 and operably coupled with the solenoid 90 of water inlet valve 82, and gate valve 96. The assembly 20 further includes a tank position sensor switch 108 having a toggle arm 109. An elongated, depending, slotted actuating arm 110 is attached to the exterior of tank side wall 24. The slot of arm 110 receives toggle arm 109 as shown. The purpose of this arrangement is to sense the up or down position of tank 12 so that PLC 104 can operate inlet valve 82 as necessary to fill tank 12. In addition, up or down actuation of toggle arm 109 provides count information to counter 104a associated with PLC 104, so that the number of tank movements and water fills is counted In lieu of the sensor 108 and actuating arm 110, the position of tank 12 may be sensed by a proximity sensor, a position transducer, or an optical sensor such as a laser. Alternately, a pair of limit switches could be provided at the limits of tank movement. In all instances, the goal is to determine the number of up or down tank movements and/or water fill cycles for the tank 12, and to count these movements and/or cycles.

It will be appreciated that the watering devices of the invention are often used in harsh and highly corrosive environments. Accordingly, it is possible to construct the tank and frame assemblies from a variety of materials, e.g., steel, stainless steel, concrete, synthetic resin, or rubber-like materials.

Operation

The operation of watering device 10 will next be described, assuming that the tank 12 is filled with water as shown in FIG. 5 and is therefore in its lowermost position owing to the weight of water within the tank, and the tank position sensor 108, toggle arm 109 and actuating arm 110 are oriented to count when the tank reaches its uppermost level depicted in FIG. 6. Preferably, the tank holds about 20 gallons of water when fill, and the water level is approximately 2-3 inches from the top of the tank. At the lowermost water level the water at a minimum preferably covers the inlet 32 to prevent freezing in cold weather conditions; in such a case the quantity of water at the lowest level is 2-3 gallons.

As animals consume water from the initially full tank 12, the weight of the water within the tank decreases, causing spring 72 to incrementally, pivotally move the tank 12 upwardly about the axis of pivot shaft 64 until the FIG. 6 position is reached. Preferably, the tank 12 pivots through an arc of about 2.5-3, which corresponds to approximately 1.65 inches of vertical travel of the tank on the side thereof opposite shaft 64. At this point the actuating arm 110 shifts toggle arm 109, and such action is communicated to PLC 104 and counter 104a. The PLC 104 then operates to open water valve 82 via solenoid 90 so that water flows through the valve and pipe 88 to fill opening 32 of tank 12. Water is thus added to the tank 12 until the tank is again full, such action gradually pivoting the tank 12 downwardly against the bias spring 72 because of the increasing weight of water therein. It will be appreciated that the up and down movement of tank 12 is guided by means of the interfit between tank guide rail 42 and guide channel 62.

This down-up cycling of tank 12, corresponding to water depletion and subsequent water addition thereto, continues for a predetermined number of cycles, typically around 10 cycles. When the predetermined number of cycles is recorded in counter 104a, the PLC 104 operates gate valve 96 in order to completely drain the tank 12. During this sequence while the drain valve is open, the inlet valve 82 is again actuated to fill the tank 12, thereby flushing debris and contaminants from the tank. Thereupon, the drain valve is closed to refill the tank 12, and the counter 104a is reset to zero so that the process repeats itself. In preferred practice, tank drainage occurs when the water level therein is at the lowest level illustrated in FIG. 6. This serves to minimize the amount of fresh water used during tank drainage.

It will of course be appreciated that the device 10 could be operated in the reverse fashion, i.e., the sensor 108 could be set to toggle when the tank 12 reaches its lowermost or water full position.

One operational advantage of the present invention is that the tank 12 is easily removable from the supporting assembly 14, in order to allow easy access to all of the components beneath the tank. This facilitates repair and replacement of these components.

A prototype device in accordance with the invention was tested against a conventional float-type watering device by placing each device in an individual cattle feedlot pen containing approximately 30 animals. Over a 28 day period, the average water usage for the conventional device was about 280 gallons/day, whereas the prototype used approximately 360 gallons/day. The estimated amount of water drained per day for cleaning purposes was about 25 gallon for the conventional device (1 drain/day), and about 15 gallons for the prototype (3 drains/day). Accordingly, the increased water usage with the prototype was attributed to increased water consumption by the cattle, owing to access clean water at all times. Bacteria counts were performed during a five day period of the test, and demonstrated that Coliform bacteria counts were 2884 CFU/ml of water for the conventional device, and only 13 CFU/ml of water for the prototype. Generic *E. coli* counts were 127 CFU/ml of water for the conventional device, and 0 CFU/ml of water for the prototype. It is believed that these bacterial count results stem from the fact that in the conventional float-type device the water level always filled back to the same level in the tank. However, in the present invention, the water levels change within a range as water is consumed, so the build up of contaminants or scum attached to the tank walls is significantly reduced.

We claim:

1. A method of maintaining an animal watering device comprising the steps of providing an animal watering device comprising a watering tank having:
   a support assembly operable to support said tank and to cause movement thereof between an elevated position corresponding to a lower water level in the tank, and a lowered position corresponding to a higher water level in the tank;
   a selectively actuatable water fill assembly operably coupled with said tank in order to add water to the tank;
   a selectively actuatable drain valve assembly operably coupled with said tank in order to drain the tank; and
   a control assembly operably coupled with said tank and drain valve assembly, said control assembly operable to actuate said drain valve assembly after a predetermined number of movements of said tank between said elevated and lowered positions thereof;
   monitoring the position of said tank;
   successively adding water to said tank when said tank reaches said elevated position corresponding to said lower water level, and in response thereto causing said tank to move to said lowered position corresponding to said higher water level; and
   draining water from said tank after a predetermined number of said movements of said tank between said elevated and lowered positions thereof.

2. The method of claim 1, said support assembly including a pivot mechanism pivotally supporting said tank.

3. The method of claim 2, said support assembly including a lift spring operably engaging said tank and biasing the tank upwardly.

4. The method of claim 1, said water fill assembly including a solenoid-operated water inlet valve adapted for coupling with a source of water, a fill pipe between said inlet valve and tank, said inlet valve operably coupled with said control assembly.

5. The method of claim 1, said tank having a drain opening, said drain valve assembly including a gate member shiftable between a drain closed and a drain open position, and mechanism for selectively shifting the gate member between said closed and open position.

6. The method of claim 5, said gate member-shifting mechanism comprising a motor and a gear drive operably coupled with the gate member.

7. The method of claim 1, said control assembly including a digital control device operably coupled with said water fill assembly and said drain valve assembly, at least one sensor for sensing the position of said tank, and a counter operable to count the number of said tank movements.

8. The method of claim 7, said control device operable to activate said drain valve assembly when said counter counts said predetermined number of tank movements.

9. The method of claim 1, including the step of counting the number of said tank movements using a counter, and draining water from said tank when said counter records said predetermined number of tank movements.

10. The method of claim 1, including the step of monitoring the position of said tank using at least one tank position sensor.

11. The method of claim 1, including the step of adding the water to said tank by opening of a water inlet valve operably coupled with the tank in response to movement of the tank to said elevated position thereof.

12. The method of claim 1, said tank including a drain and a gate member shiftable between a drain open and a drain closed position, said water draining step comprising the step of shifting said gate member to said drain open position after said predetermined number of tank movements have been recorded.

13. The method of claim 12, including the step of using a digital controller operably coupled with said gate member and a counter for recording the number of said tank movements, in order to shift the gate member to said drain open position thereof.

* * * * *